United States Patent
Khisti et al.

(10) Patent No.: US 10,638,202 B1
(45) Date of Patent: Apr. 28, 2020

(54) STATE SYNCHRONIZATION AND MANAGEMENT FOR TWO-WAY CONNECTED CONSUMER ELECTRONIC DEVICES

(71) Applicant: CSC Holding, LLC, Bethpage, NY (US)

(72) Inventors: Pradip Khisti, Hicksville, NY (US); Richard Neill, Syosset, NY (US); Patrick J. Donnoghue, Sea Cliff, NY (US); Christopher S. Lucas, Glen Head, NY (US)

(73) Assignee: CSC Holdings, LLC, Bethpage, NY (US)

( * ) Notice: Subject to any disclaimer, the term of this patent is extended or adjusted under 35 U.S.C. 154(b) by 1640 days.

(21) Appl. No.: 13/840,486

(22) Filed: Mar. 15, 2013

(51) Int. Cl.
*H04N 21/643* (2011.01)

(52) U.S. Cl.
CPC .............. *H04N 21/64322* (2013.01)

(58) Field of Classification Search
CPC ........... H04N 21/2405; H04N 21/2347; H04N 21/25866; H04N 21/4126; H04N 21/41407; H04N 21/4143; H04N 21/42207; H04N 21/4227; H04N 21/4405; H04N 21/47202; H04N 21/4722; H04N 21/4753; H04N 21/4758; H04N 21/63345; H04N 7/1675; H04N 7/17336; H04N 21/64322

See application file for complete search history.

(56) References Cited

U.S. PATENT DOCUMENTS

| | | | |
|---|---|---|---|
| 2009/0094662 A1* | 4/2009 | Chang | H04N 7/162 725/141 |
| 2011/0273625 A1* | 11/2011 | McMahon | H04N 21/6334 348/734 |
| 2011/0298596 A1* | 12/2011 | Warrick | G06F 21/305 340/12.53 |
| 2013/0332979 A1* | 12/2013 | Baskaran et al. | 725/132 |

* cited by examiner

*Primary Examiner* — Chenea Davis
(74) *Attorney, Agent, or Firm* — Sterne, Kessler, Goldstein & Fox P.L.L.C.

(57) ABSTRACT

Disclosed herein are system, method, and computer program product embodiments for managing state synchronization between two-way connected consumer electronic devices. An embodiment operates by receiving a state change event message from a target device, determining if one or more subscriber devices are associated with the target device, and propagating the state change event message to the determined subscriber devices.

20 Claims, 4 Drawing Sheets

STATE SYNCHRONIZATION AND MANAGEMENT FOR TWO-WAY CONNECTED CONSUMER ELECTRONIC DEVICES

BACKGROUND

Consumer demand for ways to interact with content has increased dramatically. With the advent of the Internet, customers expect to have more flexibility than ever when interacting with content, in particular multimedia content viewed on a television set. For example, customers may demand the same degree of interactivity when viewing broadcast media displayed using a set-top-box (STB) as when viewing media in a browser. However, creating such a user experience has proved challenging.

BRIEF SUMMARY

Embodiments described herein include various computer implemented method, system, and computer program product embodiments, and combinations and sub-combinations thereof, for managing state synchronization between two-way connected consumer electronic devices. In an example embodiment, managing state synchronization includes receiving a state change event message from a target device, determining if a subscriber device is associated with the target device, and propagating the state change event message to the determined subscriber device.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for managing state synchronization between two-way connected consumer electronic devices.

Overview

Figure 1:
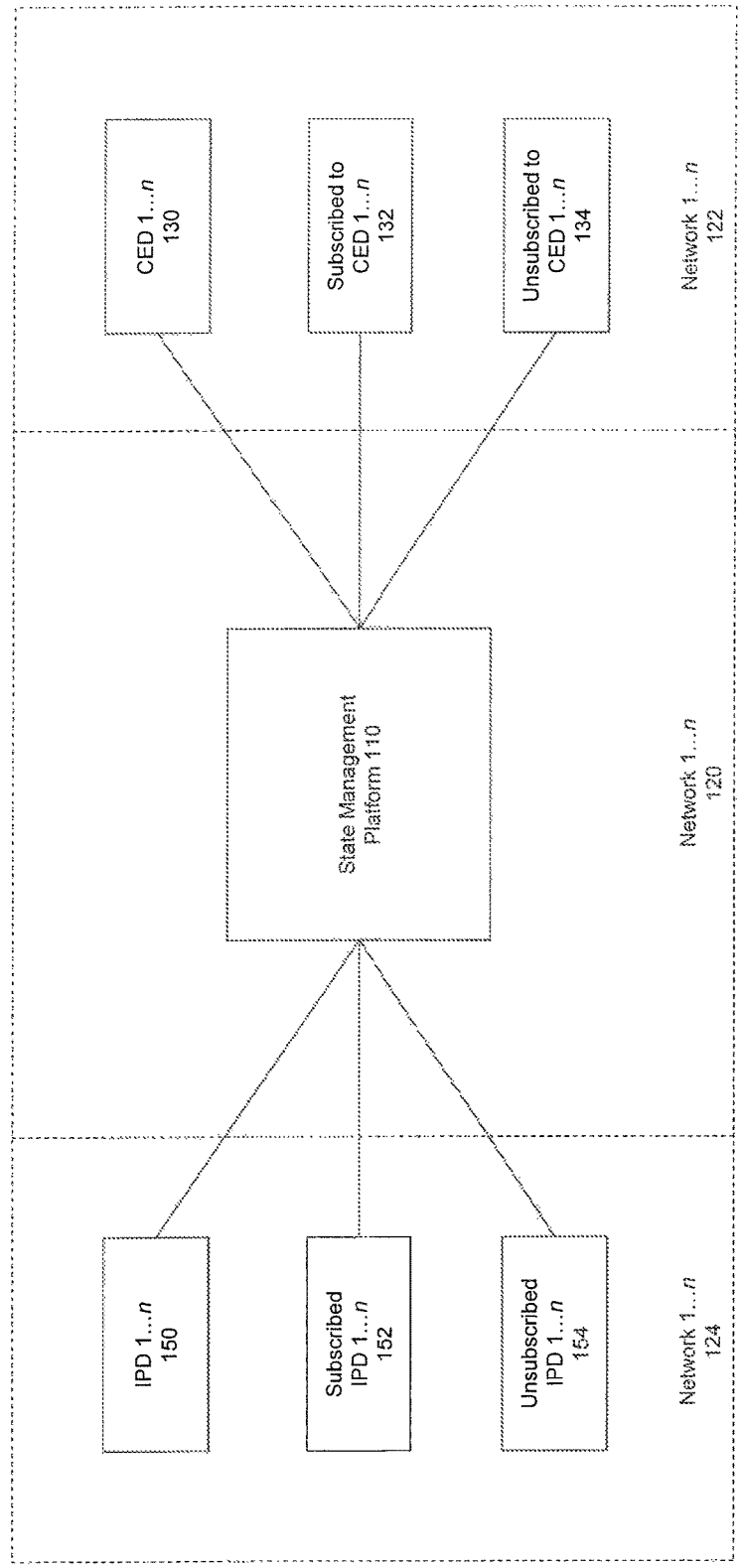
FIG. 1 is a block diagram of a state synchronization and management architecture, according to an example embodiment.

FIG. 1 illustrates a state management architecture 100 in which embodiments, or portions thereof, may be implemented.

In an example embodiment, state management architecture 100 enables two-way synchronization of state-ful operations between two-way connected consumer electronic devices (CED) across a network. A CED may include but is not limited to a set-top-box (STB), DVR, Smart-TV, PC, game-console, server, and/or other IP enabled device (IPD). A CED may include any device that supports execution of one or more processes across a network on a system providing for bidirectional connectivity. In general, a CED may include but is not limited to a device enabling audio and video content to be displayed from an external source of signal on to a television screen to which it is connected. An IPD may include but is not limited to a smart phone, Wi-Fi enabled device, tablet, PC, and/or other device. A state change event may include but is not limited to a change in state with respect to an event and/or event type running on a CED. Detailed information may be available about an event and/or an event type running on a CED and/or IPD.

In an example embodiment, state management architecture 100 enables supporting linking and/or integration of multiple two-way connected devices or processes across one or more networks, such as, for example, networks 1 ... *n* 120, networks 1 ... *n* 122, and/or networks 1 ... *n* 124. State management architecture 100 enables applications that execute on one or more centralized servers and two-way connected devices to coordinate, thereby allowing customers of service provider managed networks, for example, to coordinate use of two-way connected devices. In an example embodiment, one or more customers of one or more service providers may request content, interact with services, and/or control the functionality of one or more CEDs, as enabled by state management architecture 100.

In an example embodiment, state management architecture 100 enables systems for managing the states of one or more CEDs using one or more IPDs across one or more networks, thereby allowing a customer of a service provider to request a CED to play, for example, video on demand (VOD) and/or DVR assets as well as receive state information of CEDs. In an example embodiment, state management architecture 100 allows IPDs to be used as extendable remote controls operable to activate content on and/or interact with CEDs, enhancing interactivity of the viewing experience on, for example, a television set.

In an example embodiment, state management architecture 100 provides enhanced user interface functionality, for example, by using smart phone and/or tablet user interface elements (e.g., scrubber bars for forward/backward navigation of a multimedia program) to manage remote operations on one or more CEDs. State management architecture 100 may enable collection of usage statistics from one or more CEDs and one or more paired IPDs. State management architecture 100 may enable display of one or more interactive elements such as, for example, contextual presentation of display elements configured to receive selections based on coordination between a CED and one or more paired IPDs.

In an example embodiment, a CED pushes events to an IPD using one or more push notifications sent from a CED to an IPD, synchronizing states between an IPD and a CED across one or more networks. In an example embodiment, server side applications may use state management architecture 100 to synchronize and manage messages across one or more executing application processes and one or more two-way connected devices.

In an example embodiment, state management architecture 100 uses a centralized storage model for managing one or more device profiles or settings, synchronized across two-way connected devices in real-time. In an example embodiment, a centralized storage model enables states of one device to reflect automatically to one or more other devices in real-time. A centralized storage model may include, for example, a cloud based datastore.

In an example embodiment, state management architecture 100 identifies, defines, controls, and/or manages programming, media, and/or content displayed, watched, and/or interacted with on a CED using one or more IPDs. State management architecture 100 is, for example, configured to identify, define, control, and/or manage messages containing data between two-way connected devices, enabling two-way state synchronization.

In an example embodiment, state management architecture 100 controls and/or manages programming displayed on a primary CED using one or more secondary IPDs acting as enhanced, extendable remote controls for the primary CED.

In an example embodiment, one or more IPDs may be authenticated for a given house-hold to be used as enhanced, extendable remote controls for one or more CEDs. An IPD is thereby enabled to reflect the current state of a CED in real-time. State information may provide specific details of a CED's state at a given instant in time, which is reflected to one or more paired IPDs. An IPD may also send state change requests, for example, to change one or more programs viewable on a CED.

In an example embodiment, state management architecture 100 addresses the scenario in which a CED is powered off or in standby mode. For example, a state parameter may include that the CED is powered on or powered off. By way of a non-limiting example, error states or failures may be encountered when a CED is powered off or in standby mode. When such an error is encountered, state management architecture 100 generates an error description with a corresponding code which may be sent to an IPD in the form of a notification. Following an error message, unless otherwise specified, any connection between a CED and an IPD may be terminated.

As referred to throughout herein, the terms "programming," "program," "media," "event," "asset," "multimedia," and "content" may be used interchangeably.

(a) State Synchronization and Management Architecture

As shown in FIG. 1, state management architecture 100 may include a full-duplex capable server such as, for example, a state management platform 110, one or more full-duplex capable clients such as, for example, CEDs 1 . . . n 130 and IPDs 1 . . . n 150, and one or more networks such as, for example, networks 1 . . . n 120, networks 1 . . . n 122, and/or networks 1 . . . n 124. One or more clients may connect to state management platform 110 over one or more networks. State management platform 110 may include a conventional web server, email server, and/or file transfer server. Full-duplex capable clients may be characterized as subscribed to CEDs 1 . . . n 132, unsubscribed to CEDs 1 . . . n 134, subscribed IPDs 1 . . . n 152, and/or unsubscribed IPDs 1 . . . n 154. As referred to throughout herein, CED 130 and/or IPD 150 refer generally to client devices independent of any such characterization as, for example, subscribed or unsubscribed.

In an example embodiment, CED 130 and/or IPD 150 may be devices that include at least one processor, at least one memory, and at least one network interface. A full-duplex capable client device such as, CED 130 and/or IPD 150, may be implemented on one or more of a smart phone, tablet, mobile phone, game console, STB, personal digital assistant (PDA), personal computer (PC) (e.g., laptop, desktop), and the like. As referred to throughout herein a representative CED is a STB. One having skill in the relevant art(s) would appreciate that other representative devices are possible and a STB operating on a service provider managed network is referred to for purposes of illustration only.

In an example embodiment, network 120, network 122, and/or network 124 may include one or more networks, such as the Internet. Network 120, network 122, and/or network 124 may include one or more wide area networks (WAN) or local area networks (LAN). Network 120, network 122, and/or network 124 may include one or more wide service provider managed networks and/or telecommunications networks. Network 120, network 122, and/or network 124 may include one or more network technologies such as Ethernet, Fast Ethernet, Gigabit Ethernet, a variant of the IEEE 802.11 standard such as Wi-Fi, and the like. Communication over one or more of network 120, network 122, and/or network 124 may utilize one or more network communication protocols, including but not limited to reliable streaming protocols such as, for example, TCP.

In an example embodiment, full-duplex capable clients and/or state management platform 110 may be in data communication over one or more of network 120, network 122, and/or network 124 using TCP. In an example embodiment, network 120 uses a centralized storage model which includes, for example, a cloud based datastore. Networks 122 and 124 may be service provider managed networks enabling data communication between one or more of CED 130 and/or IPD 150 and state management platform 110. In an example embodiment, a service provider managed network includes but is not limited to a cable, network, and/or Internet service provider (ISP), a telecommunications service provider, or any combination thereof. One having skill in the relevant art(s) would appreciate that other network infrastructures are possible, provider managed or otherwise, either alone or in combination with those listed by way of example herein.

(b) State Management Platform System Components

Figure 2:
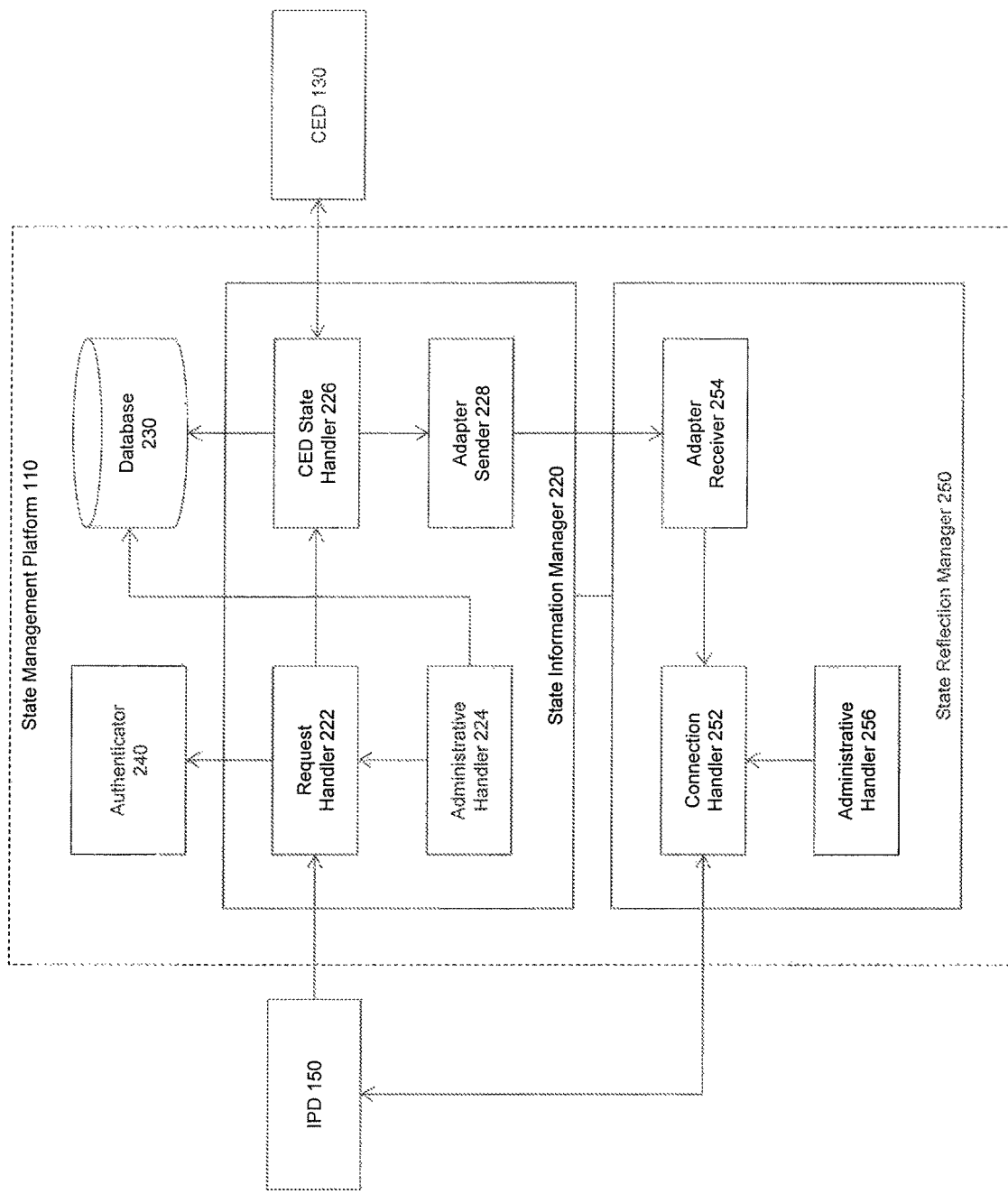
FIG. 2 is an expanded view of a state synchronization platform, according to an example embodiment.

FIG. 2 shows a system 200 illustrated as an expanded view of state management platform 110, connected to representative IPD 150 and CED 130. One having skill in the relevant art(s) will understand that IPD 150 and CED 130 may also represent a plurality of devices connected to state management platform 110 in accordance with FIG. 1.

In an example embodiment, state management platform 110 includes a state information manager 220, a database 230, an authenticator 240, and/or a state reflection manager 250. State information manager 220 propagates CED state change messages to IPD 150. Propagation of CED 130 states to IPD 150 may include propagation of state change event messages using, for example, socket communication protocol, such as, for example, WebSocket protocol, to enable bi-directional, full-duplex communication over a TCP connection between IPD 150 and state information manager 220. One or more caching layers may store one or more mappings between the various components of system 200. Database 230 may serve as a persistent primary source of information such as, for example, for information associated with a pairing of CED 130 with IPD 150. In an example embodiment, authenticator 240 validates IPD 150 details.

In an example embodiment, state information manager 220 receives and handles subscribe and/or unsubscribe requests for CED 130 state change messages. IPD 150 may, for example, initiate communication with state information manager 220 in order to start receiving messages from a CED 130 to which it is paired. CED 130 updates may be sent as byte array structures to IPD 150.

As shown in FIG. 2, in an example embodiment, state information manager 220 includes a request handler 222, an adapter sender 228, a CED state handler 226, and an administrator handler 224. State information manager 220 manages routing of messages from CED 130 to state reflection manager 250 and handles explicit subscribe and/or unsubscribe requests. In an example embodiment, state information manager 220 may serve as the single point at which CED 130 interacts with external sources.

In an example embodiment, request handler 222 includes a thread pool component that handles request-response including, for example, HTTP requests to pair with and subscribe to CED 130 to receive state change event messages. Adapter sender 228 includes a thread pool component which handles propagation of CED 130 state change event messages. CED state handler 226 includes a thread pool component that handles request-response from CED 130 and sends request-response to adapter sender 228 for propagation to IPD 150 by state reflection manager 250. Administrator handler 224 includes a thread pool component that monitors inactivity for CED 130 against a configured time limit, after which an unsubscribe call is invoked by request handler 222.

As shown in FIG. 2, state reflection manager 250 includes a connection handler 252, an adapter receiver 254, and an administrative handler 256.

In an example embodiment, adapter receiver 254 includes a thread pool component that receives CED 130 state change event messages from adapter sender 228 on state information manager 220. Adapter receiver 254 propagates these messages to connection handler 252 on state reflection manager 250. Connection handler 252 includes a thread pool component that handles request-response messages from state reflection manager 250, including message propagation to IPD 150. Administrative handler 256 includes a thread pool component that monitors inactivity for CED 130 against a configured time limit after which an unsubscribed call is invoked by connection handler 252.

(c) Flows for Managing State Synchronization

Figure 3:
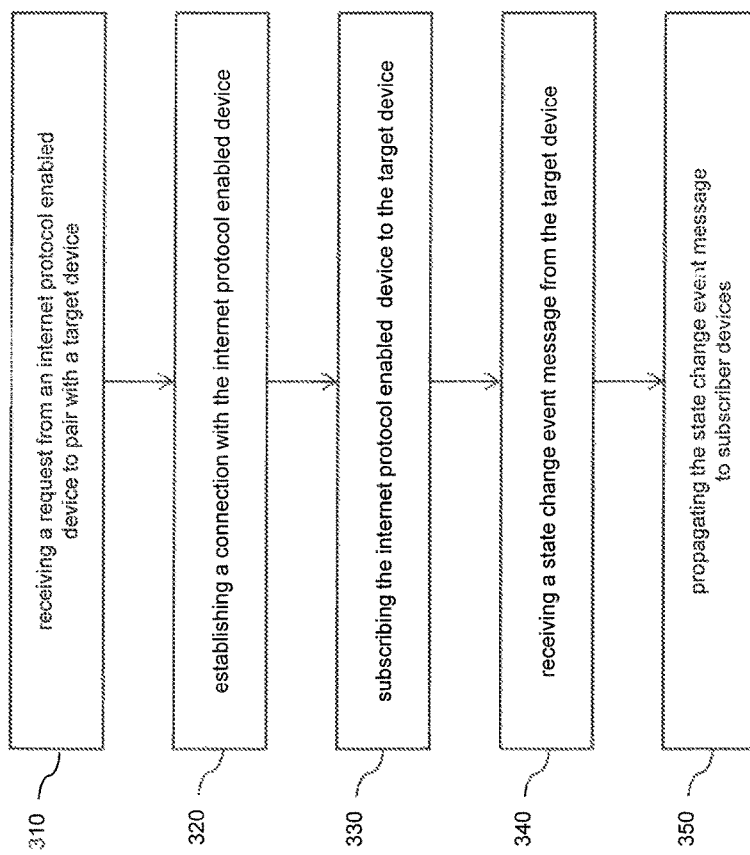
FIG. 3 is a flowchart illustrating a process for managing state synchronization between two-way devices, according to an example embodiment.

FIG. 3 is a flow diagram illustrating a method for managing state synchronization between two-way connected consumer electronic devices, according to an embodiment.

Method 300 begins at step 310, where a request is received from an internet protocol enabled device to pair with a target device, such as, for example, pairing IPD 150 with CED 130.

(i) IPD Authentication

In an example embodiment, pairing of IPD 150 with CED 130 includes a process of authenticating IPD 150. IPD 150 sends a HTTP request to state information manager 220 which may include parameters such as, for example, a user ID, a password, and/or a device ID. A load balancer and/or firewall on the state information manager 220 side handles and routes this request. Request handler 222 receives this request. One or more threads handle this request and query authenticator 240 with values provided as part of the request parameters. Authenticator 240 checks for validity of the received credentials. Once successfully authenticated, authenticator 240 passes an AuthToken to state information manager 220. An AuthToken may contain details regarding one or more CEDs 130 associated with a given house-hold on, for example, a service provider managed network 122. Details may include data available to a service provider such as, for example, a DVR entitlement flag, unique identifier for a house-hold account, list of house-hold users, a hub-ID associated with CED 130, if the user is an administrator, a service flag, a list of CEDs 130 for a house-hold, an IP address of CED 130, a MAC address of CED 130, make, model, and/or serial number of CED 130 etc.

In an example embodiment, once the authentication process has been successfully completed, an IPD 150-AuthToken mapping is stored in database 230. A final authentication status message may be sent as a response to IPD 150 (e.g., an AuthToken message sent if successful, failure status code message sent if unsuccessful).

(ii) IPD-CED Pairing Validation

In an example embodiment, pairing of IPD 150 with CED 130 includes storing details associated with IPD 150 as pairing data to one or more caches. In the case of an already existing pairing for the same IPD 150, new pairing data replaces previous pairing data. New pairing information may be stored in database 230 as well as the caching layer. In an example embodiment, restrictions may be imposed such that at any point, IPD 150 may be paired with only one CED 130, whereas CED 130 may be paired with a plurality of IPDs 150 and vice versa. Such restrictions may be configured or re-configured.

In an example embodiment, IPD 150 sends a request to pair with CED 130 to state information manager 220. A request may include parameters such as, for example, CED 130 serial number (e.g., as uniquely identifying CED 130), AuthToken (e.g., as received post-successful authentication), and/or a device ID (e.g., uniquely identifying IPD 150). A load balancer and/or firewall on the state information manager 220 side routes this request to request handler 222, which receives the request. Request handler 222 verifies if the AuthToken passed is mapped to IPD 150. If a valid AuthToken is passed, then request handler 222 checks if IPD 150 can pair with CED 130, for example, by checking if the serial number passed matches any of the CED 130 serial numbers in the house-hold. If IPD 150 may pair with the indicated CED 130, then request handler 222 stores a mapping of IPD 150 details with AuthToken and CED 130 in database 230 as well as its cache. If IPD 150 already has pairing information in the cache and/or database 230, information is replaced with the latest information. This would occur, for example, where re-connection is sought with the same CED 130 after connectivity has been lost. If no previous information exists, then a new mapping may be stored to the cache and database 230, such as where IPD 150 may be trying to pair with a different CED 130. After a successful update, request handler 222 sends a status confirmation message to IPD 150.

In an example embodiment, state reflection manager 250 invokes a validation call to state information manager 220 for verifying the CED 130-IPD 150 pairing. Connection handler 252 stores IPD 150 connection reference in its cache. IPD 150 sends out a request to subscribe for state change event messages associated with CED 130. Connection handler 252 sends an IPD 150 validation request to state information manager 220. The load balancer on the state information manager 220 side routes this request to request handler 222. A thread on request handler 222 queries the cache and/or database 230 for valid mapping information for IPD 150. The pairing validity status (e.g., success, failure) is received by request handler 222. Request handler 222 communicates back the status to connection handler 252. Request handler 222 may also copy missing CED 130-IPD 150-AuthToken mappings from database 230 to the cache for sync up. If the validation is a failure then state reflection manager 250 sends a failure message to IPD 150, closes the WebSocket connection with IPD 150, and/or deletes the CED 130-IPD 150 connection reference mapping from its cache. If the validation is successful, then state reflection manager 250 keeps the WebSocket connection to IPD 150 open and also stores the CED 130-IPD 150 connection reference mapping for propagation of CED 130 state change event messages to IPD 150. If validation is successful then state reflection manager 250 retains IPD 150 connection reference in its cache as well as CED 130-IPD 150 connection reference mapping for further propagation of CED state change even messages.

In an example embodiment, state information manager 220 receives an IPD 150-specific validation request from state reflection manager 250 which includes CED 130 and IPD 150 details. State information manager 220 validates the pairing information against its cache and/or database 230 and returns a success or failure message to state reflection manager 250. If validation is successful, state information manager 220 verifies if there are subscribed IPD 152 already subscribed to CED 132, as shown in FIG. 1. State information manager 220 may determine this status by looking up CED 130 mapping in its cache and/or database 230. In an example embodiment, if the lookup returns even one subscribed IPD 152, then state information manager 220 stores IPD 150 to the existing list of subscribers. If the lookup fails to return an existing and/or unsubscribed IPD 154, then state information manager 220 directs a subscribe request to CED 130. If the response to the subscribe request is successful then state information manager 220 may store the IPD 150-CED 130 mapping in database 230 and/or on its cache. If the response to the subscribe request is a failure then state information manager 220 may send an unsuccessful subscribe status response to state reflection manager 250. If state reflection manager 250 receives an unsubscribe message from state information manager 220, state reflection manager 250 may execute an unsubscribe sequence comprising one or more steps of propagating messages for unsubscribed to CED 134 to IPD 154, closing the connection with IPD 154, and/or deleting the CED 134-IPD 154 reference from its cache.

In an example embodiment, if state reflection manager 250 receives a validation failure response from state information manager 220 then state reflection manager 250 may execute a termination sequence comprising one or more of the steps of propagating a validation failure message to IPD 150, closing the connection with IPD 150, and/or deleting the CED 130-IPD 150 connection reference from its cache.

(iii) IPD Open Connection Request

In an example embodiment, in step 320, a connection is established with the internet protocol enabled device.

In an example embodiment, IPD 150 tries to establish a WebSocket connection with state reflection manager 250, wherein state reflection manager 250 is configured to listen for incoming connections on a predefined port. In an example embodiment, state reflection manager 250 accepts connection requests by default and stores a CED 130-IPD 150 connection reference mapping in one or more local memory caches, thereby allowing state reflection manager 250 to uniquely identify and/or send communications directly to IPD 150. Once a connection is established, IPD 150 initiates a request to state reflection manager 250 to listen and/or receive CED 130 state change event messages.

In an example embodiment, the request is sent as a WebSocket message with the IPD 150 details along with AuthToken and CED 130 details as part of the resulting payload data. Payload data associated with a push of CED 130 state information may include one or more fields including but not limited to a transaction ID, serial number of paired CED 130, an event type (e.g., VOD, VOD preview, DVR recording, TV etc.), a channel number and/or call sign, a volume level on CED 130, a bar position (e.g., current position of the program playing), record state (e.g., recording, not recording), trick modes (e.g., play, rewind, fast forward, stop, pause), buffer positioning, record positioning, asset ID, preview ID, duration (e.g., start time, end time), speed, last channel number etc. Such details may be sent to state information manager 220 for validation and may include parameters such as, for example, a CED 130 serial number, AuthToken (e.g., as received post-successful authentication), a user ID, and/or a device ID. A load balancer on the state reflection manager 250 side routes this request to connection handler 252. Connection handler 252 opens a WebSocket connection to IPD 150.

(iv) Register and Subscribe to CED

In an example embodiment, in step 330, the internet protocol enabled device is subscribed to the target device.

In an example embodiment, upon successful validation response of a CED 130-IPD 150-AuthToken mapping, state information manager 220 sends the status to state reflection manager 250 and begins the steps of processing for registering IPD 150 to CED 130. Request handler 222 checks if the mapping exists in the cache. Request handler 222 sends a CED 130 subscribe request to CED state handler 226.

In an example embodiment, CED state handler 226 receives a call from request handler 222 to initiate a subscribe request to CED 130. CED state handler 226 sends a subscribe request to CED 130. CED state handler 226 receives successful subscribe status for CED 130 and sends notification to request handler 222 causing request handler 222 to store CED 130-IPD 150 mapping in database 230 and/or the cache.

In an example embodiment, once CED 130 receives a subscribe message from state information manager 220 it stores a flag on its internal cache enabling CED 130 to identify if there are any subscribers and hence a need to propagate state change event messages, thereby taking the form of subscribed to CED 132. In an example embodiment, flagging is performed only for the first request such that any subsequent requests by other subscribed IPD 152 do not require re-sending of the subscription request to be subscribed to CED 132, since subscribed to CED 132 has already started sending the messages.

In an example embodiment, upon rebooting, subscribed to CED 132 obtains the flag from database 230, letting subscribed to CED 132 identify if it is flagged to send any messages. In an example embodiment, subscribed IPD 152 is already subscribed to receive subscribed to CED 132 state change event messages and already has a valid open connection with state reflection manager 250. In an example embodiment, subscribed to CED 132 receives a subscription alert notification from state information manager 220 to start pushing state change event messages.

In an example embodiment, subscribed to CED 132 pushes state change event message updates to state information manager 220. CED state handler 226 sends a subscribe request to subscribed to CED 132 and receives a subscribe status response from CED state handler 226.

In an example embodiment, subscribed to CED 132 sends out state change event messages to state information manager 220 via a load balancer. The load balancer on the state information manager 220 side controls the routing of these messages. For this, the load balancer may utilize a sticky bit technique which, for example, performs IP based routing of subscribed to CED 132 messages, thus re-sending messages from subscribed to CED 132 to state information manager 220. When the subscribed to CED 132 message is received, the IP address of the subscribed to CED 132 is identified from the message header using sticky bit. Based on the determined IP address, if there is a state information manager 220 already receiving messages from subscribed to CED 132, then all further messages from the same subscribed to CED 132 are routed to the same state information manager 220 until subscribed to CED 132-state information manager 220 server binding is lost, for example, due to a period of inactivity exceeding a configured duration. In such an event, messages received from the same subscribed to CED 132 may be processed by another state information manager 220 or may be re-routed.

In an example embodiment, upon receiving a subscribed to CED 132 message, state information manager 220 checks its cache for details associated with subscribed IPD 152. If data is not found in the caching layer then a check is performed on database 230. If data is found in database 230 then a sync up operation is performed to the caching layer with the subscribed IPD 152-subscribed to CED 132 mapping. If there are no subscribed IPD 152 then state information manager 220 ignores the message and/or sends an unsubscribe notification to unsubscribed to CED 134.

In an example embodiment, if there are subscribed IPD 152 identified, then state information manager 220 looks into the cache for any program information already available to enhance the subscribed to CED 132 change state event message. If data is not found in the caching layer then a check is performed on database 230. If data exists in database 230 then the caching layer is synchronized. In an example embodiment, the message is enhanced and converted to a JSON. The JSON is sent to all subscribed IPD 152 via state reflection manager 250. Once state reflection manager 250 receives the enhanced subscribed to CED 132 message, it looks up connection references in its cache for any subscribed IPD 152. If at this stage there are no subscribers, then state reflection manager 250 sends out an unsubscribe request to state information manager 220. But if the results obtained contain one or more connection references, then state reflection manager 250 propagates the enhanced subscribed to CED 132 messages to all subscribed IPD 152, as described throughout herein.

In an example embodiment, if state reflection manager 250 sends out a request (e.g., validation request, CED 130 subscribe) and does not receive a response from state information manager 220 within a configured interval, then state reflection manager 250 may close that request and send a failure response to IPD 150. If a message last received from CED 130 by state reflection manager 250 is beyond a configured interval (e.g., 60 minutes) then state reflection manager 250 sends out an unsubscribe notification to state information manager 220. State information manager 220 upon receiving this notification deletes the CED 130-IPD 150 mapping in the caching layer and/or database 230. If it is noticed that subscribed IPD 150 is the only subscriber to CED 130, then state information manager 220 sends out unsubscribe notification to CED 130. CED 130, upon receiving this message, may then delete its flag such that no further state messages are sent. State reflection manager 250 may look up its cache for connection references to all subscribed IPD 152 and may send an unsubscribe message to all subscribed IPD 152. State reflection manager 250 then closes WebSocket connection to all unsubscribed IPD 154 and deletes mappings of all unsubscribed to CED 154-unsubscribed IPD 154 maps stored in its cache.

(v) CED State Change Propagation

In an example embodiment, in step 340, a state change event message from the target device is received.

In an example embodiment, subscribed to CED 132 sends state change messages to state information manager 220. State information manager 220 looks up the cache to check if there are subscribed IPD 152. If there are subscribed IPD 152, state information manager 220 queries database 230 for additional program details. Program details that are received are stored in the cache for the duration of the program and for utilization for any subsequent subscribed to CED 132 messages and/or specific get requests. The enhanced message is converted to a JSON message. State information manager 220 looks up the list of subscribed IPD 152 in the cache for subscribed to CED 132.

In an example embodiment, state information manager 220 checks or any existing semaphore lock on propagation of messages from subscribed to CED 132. Any lock may indicate there are previous messages from subscribed to CED 132 being propagated to subscribed IPD 152. If there is no semaphore lock, then state information manager 220 does a semaphore lock. State information manager 220 pushes enhanced subscribed to CED 132 even messages to subscribed IPD 152. State reflection manager 250 in turn receives the message and sends a success response to state information manager 220. State information manager 220 releases its semaphore lock. State reflection manager 250 checks for any existing subscribers IPD 152 in its cache. If there are subscribers IPD 152 then state reflection manager 250 converts the JSON message to byte array. State reflection manager 250 does a check for semaphore lock. If the semaphore lock does not exist then state reflection manager 250 does a semaphore lock. State reflection manager 250 then propagates the enhanced subscribed to CED 132 messages to subscribed IPD 152. Once this is done, state reflection manager 250 releases its semaphore lock.

In an example embodiment, messages from subscribed to CED 132 are processed through a load balancer on state information manager 220. The load balancer uses sticky bit functions to identify subscribed to CED 132 based on an identified IP address and to map subscribed to CED 132. Once a message is received, the load balancer obtains the IP address of the subscribed to CED 132 from the message header. The load balancer identifies the state information manager 220 that services the subscribed to CED 132 and then routes the message to that state information manager 220. CED state handler 226 receives the request routed from the load balancer. CED state handler 226 is aware of the threads servicing a specific subscribed to CED 132 is aware of the details associated with subscribed to CED 132 whose new message has been received. If there is a thread already servicing messages from the subscribed to CED 132, then new messages may be allocated accordingly. If there are no threads currently servicing the subscribed to CED 132, then one of the threads starts processing the new message and subsequent messages from the same subscribed to CED 132 will be handled accordingly.

In an example embodiment, in step 350, the state change event message is propagated to the determined subscriber devices.

In an example embodiment, after receiving the message CED state handler 226 passes the control to request handler 222 which queries the cache to check for existing subscribed IPD 152. If data is not found in the cache, then it looks up in database 230. If subscribed IPD 152 are found, propagation proceeds. If not, request handler 222 sends unsubscribe notification which is passed to CED state handler 226 for further handling of the unsubscribe request. Request handler 222 then queries database 230 to enhance the message with additional details which are retrieved from database 230. The information is stored in the chance to re-use for the duration of the program. The message is enhanced and a JSON message is created. Request handler 222 looks up the cache for a list of subscribed IPD 152 and checks for a semaphore lock on the messages propagation from subscribed to CED 132. If there is a lock, request handler 222 waits until the lock is released. If there is no lock then a semaphore lock is created. This semaphore lock allows for an ordering of messages to be retained from a particular subscribed to CED 132.

In an example embodiment, request handler 222 provides the enhanced message byte array to adapter sender 228. Adapter sender 228 sends the enhanced message to adapter receiver 254 as a JSON call over, for example, TCP/IP. The adapter receiver 254 sends success notification to adapter sender 228. Upon receiving success notification, request handler 222 releases the semaphore lock. Adapter receiver 254 then delegates the JSON message to request handler 222. Adapter receiver 254 delegates the message control to connection handler 252. Connection handler 252 obtains subscribed to CED 132 details and looks up in its cache all subscribed IPD 152 based on the connection reference. If subscribed IPD 152 are found, the message is propagated. If subscribed IPD 152 are not found, then connection handler 252 sends an unsubscribe notification to request handler 222 and ignores the message. Connection handler 252 converts the JSON message to a byte array. Connection handler 252 checks for a semaphore lock on messages propagated for subscribed to CED 132. If there is a lock, then connection handler 252 waits until the lock is released. If there is no lock, then a semaphore lock is created. Connection handler 252 propagates the enhanced subscribed to CED 132 message to all subscribed IPD 152 through the open connections via the load balancer. Once this is done, the semaphore lock on state reflection manager 250 is release by connection handler 252.

(vi) CED Inactivity Management

In an example embodiment, state reflection manager 250 initiates a ping on the connection at a configured interval for which the connection may be either kept open or closed by a firewall that may exist on the state reflection manager 250 side between state reflection manager 250 and IPD 150.

In an example embodiment, once state reflection manager 250 opens a WebSocket connection for IPD 150, connection handler 252 of state reflection manager 250 pings the connection at a configured interval to determine IPD 150 connectivity. The ping echo request packets are sent to a destination address. Connection handler 252 receives ping echo response packets indicating normal connectivity with IPD 150. The ping seeks to provide that a firewall between state reflection manager 250 and IPD 150 does not close the connection due to inactivity. If the ping echo response packets are no received then connection handler 252 waits for a configured duration and re-sends ping echo response packets up to a maximum configured number of attempts. If this ping is successful then the ping is performed after regular intervals. If the ping is unsuccessful after a maximum of attempts, then this status is updated to subscribed IPD 152. This process may avoid state reflection manager 250 from keeping broken connections with IPD 150 in its cache for CED 130 message propagation. If the ping fails then state reflection manager 250 may automatically close the connection with IPD 150 and delete the CED 130-IPD 150 connection references in its in-memory cache. In an example embodiment, this may occur if state reflection manager 250 for subscribed IPD 152 sends an unsubscribe notification to state information manager 220. State information manager 220 checks if subscribed IPD 152 is the only subscriber to subscribed to CED 132. Request handler 222 may send an unsubscribe notification to subscribed to CED 132 and/or may delete the mapping based on the result of its check.

In an example embodiment, connectivity between state information manager 220 and state reflection manager 250 is monitored by administrative handler 256. For example, administrative handler 256 repeatedly checks for the last message sent by subscribed to CED 132 (e.g., from information in its cache). If the duration is beyond a maximum configured time, then administrative handler 256 sends out an unsubscribe request to state information manager 220 for subscribed to CED 132. Connection handler 252 sends an unsubscribe status update to subscribed IPD 152. Connection handler 252 closes the connection to subscribed IPD 152 and deletes subscribed IPD 152 connection reference for subscribed to CED 132.

(vii) CED Unsubscribe Request

In an example embodiment, IPD 150 sends explicit unsubscribe request and/or a request to close WebSocket connection to state reflection manager 250. State reflection manager 250 closes the connection with IPD 150 and may delete the CED 130-IPD 150 connection reference mapping information for IPD 150 on its in-memory cache. If there are no more subscribers, then state reflection manager 250 sends an explicit unsubscribe notification to state information manager 220. Upon receiving the notification, state information manager 220 identifies the list of subscribed IPD 152 and deletes mappings, converting subscribed IPD 152 to unsubscribed IPD 154 and subscribed to CED 132 to unsubscribed to CED 134, with respect to state information manager 220, database 230, and/or the caching layer. For example, if unsubscribed IPD 154 was the only subscriber, then state information manager 220 sends an unsubscribe notification to unsubscribed to CED 134. Upon receipt of the notification, unsubscribed to CED 134 deletes its flag such that no further messages are sent.

In an example embodiment, an explicit request is made by subscribed IPD 152 to unsubscribe from subscribed to CED 132. Subscribed IPD 152 sends an unsubscribe request to state reflection manager 250. Connection handler 252 receives this WebSocket message request. Connection handler 252 closes the connection with subscribed IPD 152 and deletes subscribed IPD 152 connection reference for subscribed to CED 132 in its cache. Connection handler 252 checks for information on any other subscribed IPD 152 and if there are no other subscribers, sends an unsubscribe request to state information manager 220. Request handler 222 receives this request and deletes CED 130-IPD 150 mapping in the cache and database 230. Request handler 222 checks for any other IPD 150 subscribers in the cache and database 230. If there are no subscribers then request handler 222 sends out an unsubscribe request to CED state handler 226 which in turn sends out the unsubscribe request to CED 130. CED 130 deletes its flag to indicate that no further messages are to be sent, transforming it into unsubscribed to CED 134.

(viii) Specific IPD Requests to CED

In an example embodiment, calls are made from IPD 150 to obtain certain results from CED 130. IPD 150 may send a specific set request state information manager 220, state information manager 220 sends the specific set request to CED 130, state information manager 220 receives the status of the specific set request, and state information manager 220 propagates the status to IPD 150. State information manager 220 may query database 230 for additional program details, receive the additional program details from database 230, and propagates the enhanced message to IPD 150. State information manager 220 may send commands to the change the state of CED 130 based on requests received from IPD 150. In this manner state management architecture 100 allows IPD 150 to be used as extendable remote control operable to activate content on and/or interact with CED 130.

In an example embodiment, IPD 150 requests a CED 130 state by using the JSON request-response. This returns the state of CED 130 at the instant it is requested, such that the state can be requested in real-time. IPD 150 may request to change the state of CED 130. In example embodiment, only a subscribed IPD 152 may request a state change for subscribed to CED 132. Requests that may be handled include but are not limited to a request to get all CED 130 event states, a request to get a particular CED 130 event state, a request to display a search keyboard, a request to dim a search keyboard, a request to perform a search, a request to play a selected video on demand on CED 130, a request to play a selected asset from DVR on CED 130, a request to tune to a selected channel on CED 130, a request to perform one or manipulations and/or operations including but not limited to play, pause, stop, rewind, and/or fast forward, a request to drag a scrubber bar along a media timeline (e.g., for release at a selected time), a request to display details about a VOD asset, a request to preview a VOD asset, a request to verify a PIN number associated with CED 130, and any combination or sub-combination thereof.

In an example embodiment, a "get all event states" request includes getting the type of events running on CED 130 associated with a user account. Such an API may be invoked whenever IPD 150 seeks to get an overview about all CEDs 130 associated with a given user account. Parameters of this request may include but are not limited to one or more unique identifiers (e.g., device ID, home ID, asset ID, preview ID) and/or types of IPD 150 devices, event types (e.g., VOD, TV, DVR, INTV, LIVP, channel number etc.).

In an example embodiment, a "get state" request includes getting information about a program running on CED 130 associated with a user account. The same and other parameters as listed above may include an indication of volume level, mute, bar position, record state, trick modes, buffer position, record positions, duration, and/or speed etc.

In an example embodiment, a "show search keyboard" request includes popping open a search screen for CED 130 and "dim search keyboard" request includes dimming the search screen. A "perform search" request includes performing one or more searches on CED 130, for example, wherein the keyboard is used to enter search criteria. The same and other parameters as listed above may include a search key for submitting criteria.

In an example embodiment, a "play the chosen VOD" request includes playing a user selection of video on demand (VOD) on CED 130. A "play the chosen asset from DVR" may include playing a user selection of a DVR asset on CED 130. The same and other parameters as listed above may include, for example, an asset ID, play position, etc.

In an example embodiment, a "tune to chosen channel" request includes playing a user selection of broadcast television on CED 130. The same and other parameters as listed above may include, for example, a call sign of a channel, a channel number etc.

In example embodiment, one or more of "play/pause/stop/rewind/fast-forward" operation requests include executing these operations so as to manipulate a program being viewed using CED 130. A "drag scrubber bar" operation request includes receiving a user selection to drag a scrubber for a program on CED 130 to adjust the time frame viewed. One or more parameters may include those previously listed.

In an example embodiment, a "preview VOD details" request includes displaying details in response to a user selection of a particular VOD asset on CED 130. A "preview VOD" request includes previewing a particular VOD asset on CED 130 in response to a user selection. One or more parameters may include those previously listed.

In an example embodiment, a "verify the PIN" request includes verifying the PIN for a parental control entered by a user to, for example, a keyboard on CED 130. The same and other parameters as listed above may include, for example, a pin number.

Parameters for the above discussed request types are listed by way of example not of limitation. One having skill in the relevant art(s) will understand that parameters may be added, removed, configured, re-configured, and/or modified in response to data that is available to system 200.

In an example embodiment, state management platform 110 addresses the scenario in which a CED is powered off or in standby mode. For example, a state parameter may include that the CED is powered on or powered off. By way of a non-limiting example, error states or failures may be encountered when a CED is powered off or in standby mode. When such an error is encountered, state management platform 110 generates an error description with a corresponding code which may be sent to an IPD in the form of a notification. Following an error message, unless otherwise specified, any connection between a CED and an IPD may be terminated.

One having skill in the relevant art(s) will appreciate that other request types are possible and those listed are offered for illustrative purposes only.

(d) Example Computer System

Figure 4:
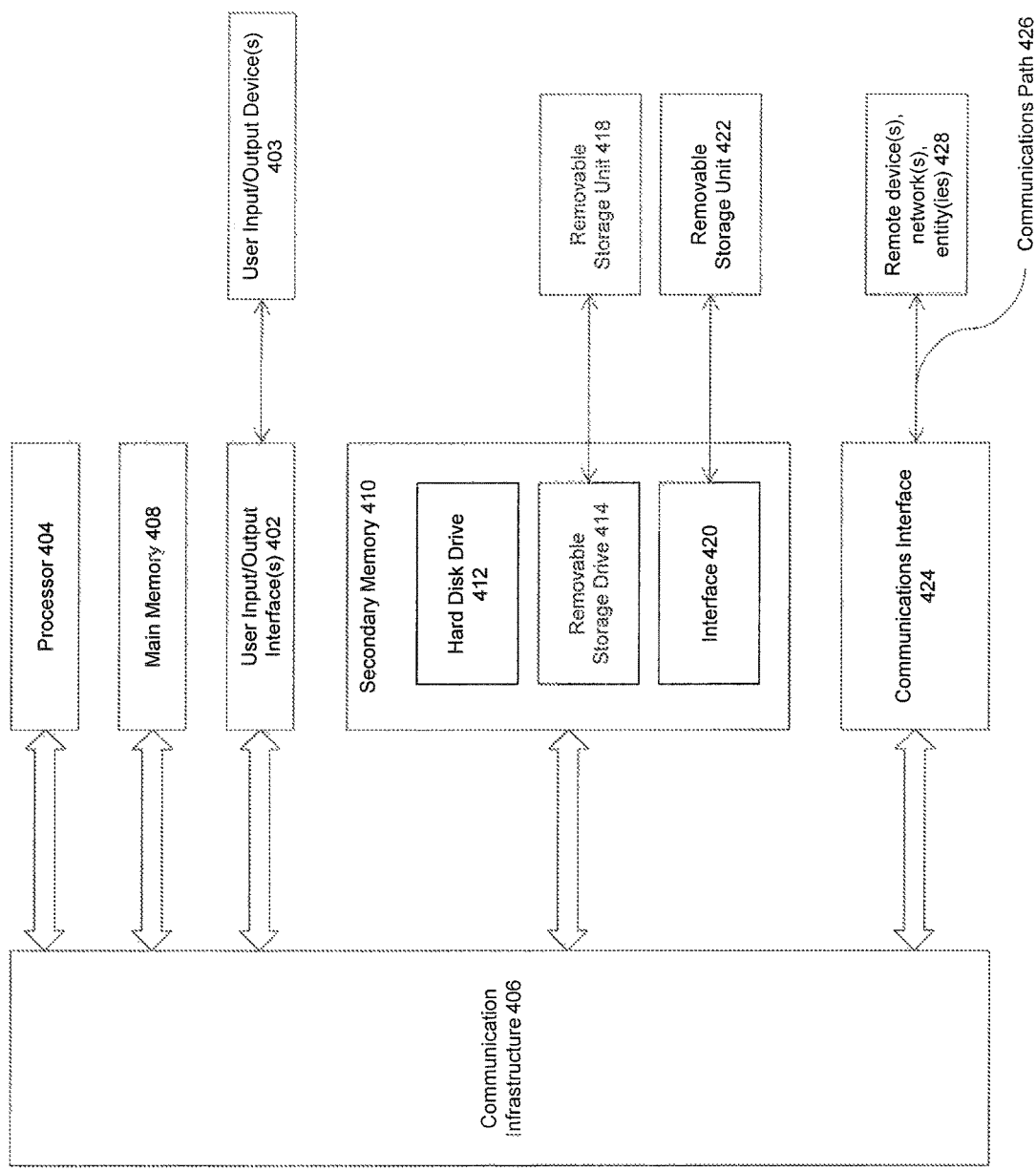
FIG. 4 is an example computer system useful for implementing various embodiments.

Various embodiments can be implemented, for example, using one or more well-known computer systems, such as computer system 400 shown in FIG. 4. Computer system 400 can be any well-known computer capable of performing the functions described herein, such as computers available from International Business Machines, Apple, Sun, HP, Dell, Sony, Toshiba, etc.

Computer system 400 includes one or more processors (also called central processing units, or CPUs), such as a processor 404. Processor 404 is connected to a communication infrastructure or bus 406.

Computer system 400 also includes user input/output device(s) 403, such as monitors, keyboards, pointing devices, etc., which communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 4. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for managing state synchronization, comprising:
    receiving a subscribe request from an internet protocol-enabled device (IPD) to receive state change event messages from a target device,
        wherein the subscribe request comprises an authentication token generated for the IPD in response to a successful verification of authentication credentials;
    verifying that the IPD can subscribe to the target device using the authentication token by confirming an association between the authentication credentials and the target device;
    pairing the IPD with the target device;
    establishing a connection with the IPD;
    subscribing the IPD to the target device;
    adding the IPD to a list of subscribed IPDs;
    receiving a state change event message from the target device; and
    propagating the state change event message to each of the IPDs in the list of subscribed IPDs.

2. The computer implemented method of claim 1, further comprising:
    receiving a request from the IPD to change a state of the target device; and
    transforming the request into one or more change state commands operable to change the state of the target device.

3. The computer implemented method of claim 1, further comprising:
    receiving a request from the IPD to display search results on the target device; and
    transforming the request into one or more queries operable to retrieve and display the requested search results for display on the target device.

4. The computer implemented method of claim 1, wherein propagating the state change event message further comprises:

routing the state change event message to a state information manager which enhances the state change event message.

5. The computer implemented method of claim 1, wherein the target device comprises a set-top-box operating in a service provider managed network.

6. A system, comprising:
a memory; and
at least one processor coupled to the memory and configured to:
receive a subscribe request from an internet protocol-enabled device (IPD) to receive state change event messages from a target device,
wherein the subscribe request comprises an authentication token generated for the IPD in response to a successful verification of authentication credentials:
verify that the IPD can subscribe to the target device using the authentication token by confirming an association between the authentication credentials and the target device;
pair the IPD with the target device;
establish a connection with the IPD;
subscribe the IPD to the target device;
add the IPD to a list of subscribed IPDs;
receive a state change event message from the target device; and
propagate the state change event message to each of the IPDs in the list of subscribed IPDs.

7. The system of claim 6, at least one processor further configured to:
receive a request from the IPD to change a state of the target device; and
transform the request into one or more change state commands operable to change the state of the target device.

8. The system of claim 6, at least one processor further configured to:
receive a request from the IPD to display search results on the target device; and
transform the request into one or more queries operable to retrieve and display the requested search results for display on the target device.

9. The system of claim 6, the at least one processor when propagating the state change event message further configured to:
route the state change event message to a state information manager which enhances the state change event message.

10. The system of claim 6, wherein the target device comprises a set-top-box operating in a service provider managed network.

11. A tangible computer-readable device having instructions stored thereon that, when executed by at least one computing device, causes the at least one computing device to perform operations comprising:
receiving a subscribe request from an internet protocol-enabled device (IPD) to receive state change event messages from a target device, wherein the subscribe request comprises an authentication token generated for the IPD in response to a successful verification of authentication credentials;
verifying that the IPD can subscribe to the target device using the authentication token by confirming an association between the authentication credentials and the target device;
pairing the IPD with the target device;
establishing a connection with the IPD;
subscribing the IPD to the target device;
adding the IPD to a list of subscribed IPDs;
receiving a state change event message from the target device; and
propagating the state change event message to each of the IPDs in the list of subscribed IPDs.

12. The computer-readable device of claim 11, the operations further comprising:
receiving a request from the IPD to change a state of the target device; and
transforming the request into one or more change state commands operable to change the state of the target device.

13. The computer-readable device of claim 11, the operations further comprising:
receiving a request from the IPD to display search results on the target device; and
transforming the request into one or more queries operable to retrieve and display the requested search results for display on the target device.

14. The computer-readable device of claim 11, the operations when propagating the state change event message further comprising:
routing the state change event message to a state information manager which enhances the state change event message.

15. The computer-readable device of claim 11, wherein the target device comprises a set-top-box operating in a service provider managed network.

16. The computer implemented method of claim 1, wherein the pairing comprises:
authenticating the IPD; and
storing details associated with the IPD as pairing data to a cache.

17. The system of claim 6, the at least one processor further configured to:
authenticate the IPD; and
store details associated with the IPD as pairing data to a cache.

18. The computer-readable device of claim 11, wherein the pairing comprises:
authenticating the IPD; and
storing details associated with the IPD as pairing data to a cache.

19. The computer implemented method of claim 1, wherein the IPD comprises a mobile phone or tablet.

20. The system of claim 6, wherein the IPD comprises a mobile phone or tablet.

* * * * *

UNITED STATES PATENT AND TRADEMARK OFFICE
CERTIFICATE OF CORRECTION

PATENT NO. : 10,638,202 B1
APPLICATION NO. : 13/840486
DATED : April 28, 2020
INVENTOR(S) : Khisti et al.

Page 1 of 2

It is certified that error appears in the above-identified patent and that said Letters Patent is hereby corrected as shown below:

On the Title Page

In Column 1, Item (72), in "Inventors", Line 3, please replace "Donnoghue," with -- Donoghue, --, therefor.

In the Specification

In Column 1, Line 64, please replace "state-ful" with -- stateful --, therefor.

In Column 6, Line 58, please replace "failure" with -- failure, --, therefor.

In Column 6, Line 66, please replace "successful" with -- successful, --, therefor.

In Column 7, Line 20, please replace "successful" with -- successful, --, therefor.

In Column 7, Line 23, please replace "failure" with -- failure, --, therefor.

In Column 9, Line 10, please replace "layer" with -- layer, --, therefor.

In Column 9, Line 21, please replace "layer" with -- layer, --, therefor.

In Column 10, Line 23, please replace "exist" with -- exist, --, therefor.

In Column 11, Line 1, please replace "lock" with -- lock, --, therefor.

In Column 11, Line 48, please replace "received" with -- received, --, therefor.

In Column 11, Line 51, please replace "successful" with -- successful, --, therefor.

In Column 11, Line 56, please replace "fails" with -- fails, --, therefor.

Signed and Sealed this
Eighteenth Day of August, 2020

Andrei Iancu
*Director of the United States Patent and Trademark Office*

CERTIFICATE OF CORRECTION (continued)
U.S. Pat. No. 10,638,202 B1

In Column 12, Line 48, please replace "subscribers" with -- subscribers, --, therefor.

In the Claims

In Column 17, Claim 6, Lines 16-17, please replace "credentials:" with -- credentials; --, therefor.

In Column 17, Claim 7, Line 30, please replace "at" with -- the at --, therefor.

In Column 17, Claim 8, Line 37, please replace "at" with -- the at --, therefor.